United States Patent
Li et al.

(10) Patent No.: US 7,934,129 B2
(45) Date of Patent: Apr. 26, 2011

(54) NETWORK HANG RECOVERY

(75) Inventors: Paul L. Li, Seattle, WA (US); Andrew J. Lagattuta, Redmond, WA (US); Matt Eason, Seattle, WA (US); Baskar Sridharan, Sammamish, WA (US); Abdelsalam Heddaya, Bellevue, WA (US); Stephan Doll, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 12/205,612

(22) Filed: Sep. 5, 2008

(65) Prior Publication Data

US 2010/0064177 A1    Mar. 11, 2010

(51) Int. Cl.
*G06F 11/00* (2006.01)
(52) U.S. Cl. .......................................... 714/38
(58) Field of Classification Search .................. None
See application file for complete search history.

(56) References Cited

U.S. PATENT DOCUMENTS

| | | | |
|---|---|---|---|
| 5,748,882 A | | 5/1998 | Huang |
| 6,629,267 B1 * | | 9/2003 | Glerum et al. .................. 714/38 |
| 7,207,047 B2 | | 4/2007 | Subramanian |
| 7,325,026 B1 | | 1/2008 | North, Jr. |
| 2005/0091611 A1 | | 4/2005 | Colleran |
| 2006/0020858 A1 * | | 1/2006 | Schaefer ........................ 714/38 |
| 2006/0031394 A1 * | | 2/2006 | Tazuma ........................ 709/217 |
| 2006/0200702 A1 | | 9/2006 | Canning |
| 2006/0242467 A1 * | | 10/2006 | Dayen et al. .................... 714/38 |
| 2007/0130324 A1 | | 6/2007 | Wang |

OTHER PUBLICATIONS

Dabrowski, C. et al., "Understanding Self-Healing in Service-Discovery Systems," http://citeseer.ist.psu.edu/cache/papers/cs/27298/http:zSzzSzw3.antd.nist.govzSz~millszSzpaperszSzWOSS2002-09-30-b.pdf/dabrowski02understanding.pdf.
Hewlett-Packard Development Company, L.P., Optimizing Failover Time in a Serviceguard Environment, http://activeanswers.compaq.com/enterprise/downloads/Optimizing%20failover_6-22.pdf.
Microsoft, "Understanding Application Recovery and Restart," http://msdn.microsoft.com/en-us/library/cc303708.aspx, retrieved Jun. 27, 2008.

* cited by examiner

*Primary Examiner* — Michael C Maskulinski
(74) *Attorney, Agent, or Firm* — Wolf, Greenfield & Sacks, P.C.

(57) ABSTRACT

A method of detecting a network hang and restoring an application that communicates on a connection giving rise to the network hang. A user experience may be improved by providing the user with an option to restore the hung application without losing unsaved data or state information. The network hang may be detected when the user tries to terminate the application. The method may include determining whether the network hang is recoverable, which may involve diagnosing a type of the hang. If recoverable, a network connection reset mechanism may be triggered by instructing a network stack of the computer to terminate the network connection.

18 Claims, 5 Drawing Sheets

NETWORK HANG RECOVERY

BACKGROUND

When an application executing on a computer becomes unresponsive to user input, the application may be said to be "hung." When the application attempts to perform an operation relating to a network, the application may become unresponsive to user input while waiting for a response from the network. This condition may be referred to as a "network hang."

For example, if a user of a client computer uses an application that interacts with a server computer over a network, the application may stop responding to user input because of various conditions on the network. A network hang may also occur when a laptop user communicating over a wireless connection moves out of range of a base station, a server goes down, or a connection with the application becomes too slow because of too much traffic on the network or for a number of other reasons. Also, while conditions on the network may be normal, an application may request a network operation requiring a large amount of data, and the application may therefore run slowly that it appears hung.

Conventional operating systems can detect hung applications based on the time that elapses between user input and a response from the application. When a user attempts to terminate a hung application, the operating system may notify the user that the application is hung and provide the user with the option of continuing with the termination process or canceling the termination process.

SUMMARY

An experience of a user of a computer may be improved by providing the user with an opportunity to recover from a network hang. When an operating system or other components of the computer detect that a user attempts to terminate an application with a network hang, the user may be offered an option to recover from the network hang. Providing this option to the user may prevent the user from closing the application and thus losing unsaved data. Other negative consequences of the user's terminating the application may also be prevented.

In some embodiments, recovery from a network hang may be achieved by breaking down a network connection used by the hung application. This event may trigger an exception handler within the application that cancels pending network operations and possibly takes other corrective action. Thereafter, the application may be restored to a state in which it can respond to user input.

In some scenarios, the hang may be of a type such that the hang may not be recoverable without undesirable consequences. For example, when the hung application shares the network connection with another application, recovering a hung application by breaking down the network connection may interfere with the other application. Certain protocols may provide connections that can support multiple applications, which would render the hang unrecoverable. Therefore, responding to a network hang may include diagnosing a type of the hang, which may be based on a protocol used in the network connection and/or whether the connection is shared with other applications. In some embodiments, a user is offered the option of recovering from a network hang only when it is first determined that the hang is recoverable.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that a network hang may be a significant distraction for a user of a computer system interacting with an application over a network. A user, tired of waiting for the application to "come back," may close the application, which may lead to loss of data or application state that the user must then recreate, leading to dissatisfaction and frustration. The applicants have recognized and appreciated that user satisfaction may be greatly improved by offering a user of an application the option of recovering from the network hang and thus bringing the application to a responsive state without first having to terminate and restart the application. Therefore, timely providing the user with an option to recover from the network hang may increase user satisfaction and improve the whole user experience.

Applicants have further appreciated that different types of network hangs may require different recovery methods. Thus, determining a type of a network hang may help determine whether the application can be recovered and what method(s) may be used to recover from the network hang.

Applicants have further appreciated that a known mechanism of responding to a network error may be used to recover from a network hang. Accordingly, some embodiments of the invention provide a method of terminating the network connection when the network hang is detected, which triggers execution of a network error recovery mechanism.

Figure 1:
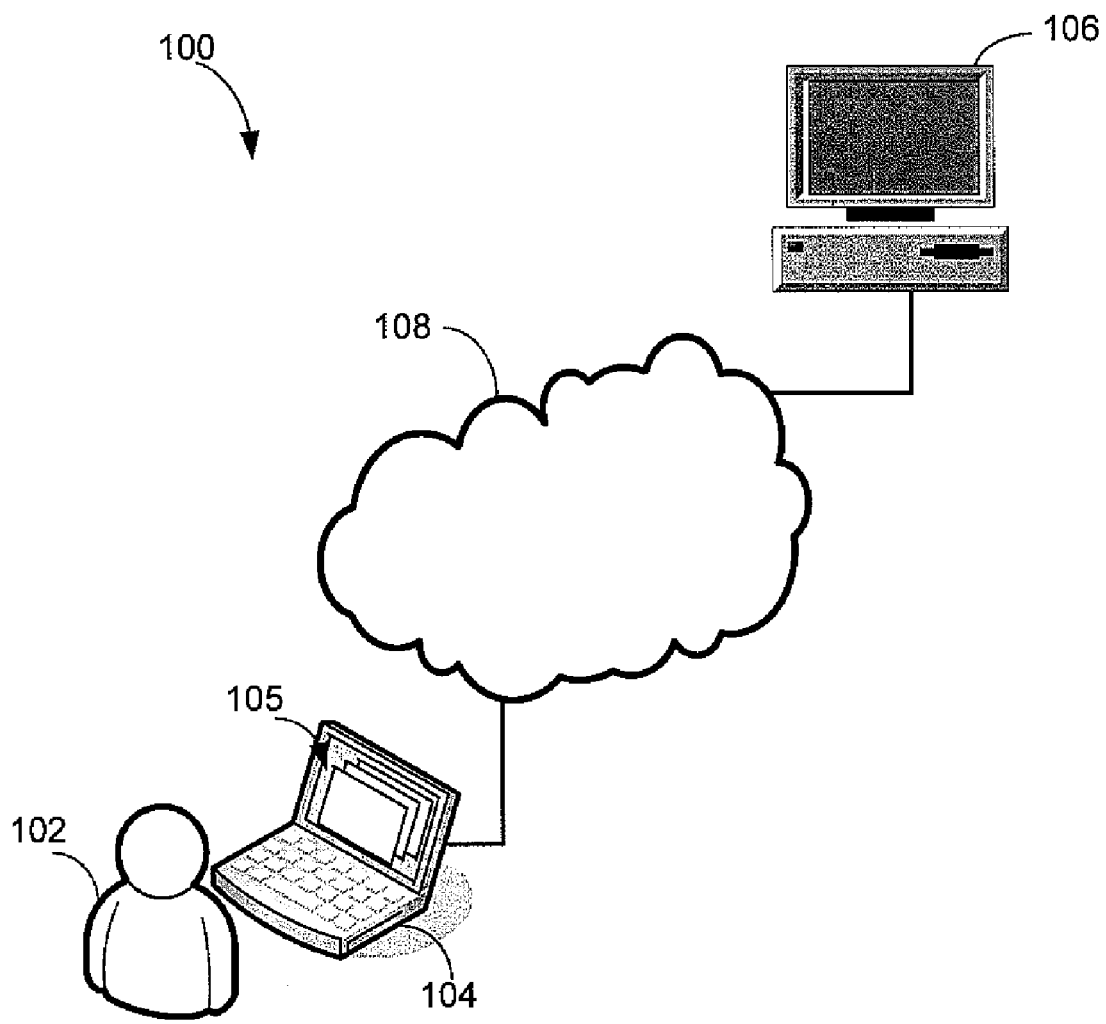
FIG. 1 is a sketch of an example of a system in which some embodiments of the invention may be implemented.

FIG. 1 shows a system 100 in which some embodiments of the invention may be implemented. System 100 comprises a user 102 of a computer 104. Computer 104 is shown as resembling a laptop computer by way of example only as any suitable computer system may be used. User 102 may utilize computer 104 to interact with one or more applications 105 executing on computer 104 to interact with computer 106 over network 108. Computers 104 and 106 may utilize a client/server architecture in which case computer 106 may be a server that may be accessible to user 102 via a network 108. Alternatively, computers 104 and 106 may communicate using a peer-to-peer architecture. Though, the nature of network operations performed by an application on computer 104 is not critical to the invention, and embodiments of the invention may be implemented for computers that perform other types of network operations. Network 108 may be the Internet, an intranet or any other suitable wired or wireless network. In addition, embodiments of the invention are not limited with respect to a type of network connections utilized by applications 105. Thus, the invention may be employed in connection with an application that uses a virtual network connection, which also may become "hung." Also, multiple users may be interacting with one or more of applications 105.

As discussed above, any of applications 105 may become unresponsive due to various network conditions. An unresponsive application may be waiting for some response from the network. The network conditions may be indicative of a problem on a network connection used by any of applications 105. The nature of the network problem is not critical to the invention. For example, the network may experience a large volume of traffic. Alternatively, the server may be running slowly or may be shut down. Further, computer 104 communicating with server 106 over a wireless network may be out of range of an access point of the wireless network. In some scenarios, the network may not experience any problems but the current operation of the application may be slow so that the user may perceive the application as hung.

One or more components of computer 104 may monitor applications executing on computer 104 to determine whether the application is hung. Such components may be integrated with computer 104 in any suitable way. For example, such a component may be incorporated into an operating system of computer 104.

Such a component may detect a hang in any suitable way. For example, a component of an operating system that implements a user interface through which user input destined for an application is received may record a time at which the user provides input. As a result, the operating system may track the time for the application to respond to the input. If that time exceeds a threshold, the application may be deemed to be hung. Such a check for a hang may be made as a background operation of the operating system or may be performed in response to a trigger event, such as a user attempting to close an application. Though, the timing and specific mechanism by which a hang is detected is not critical because any suitable techniques, whether now known or hereafter developed, may be used to detect a hang.

Once a hang is detected, the cause of the hang may be determined. Such processing may determine that the hang is a network hang. A hang caused by a network activity may be determined in any suitable way. For example, a network stack may provide an interface through which a component analyzing a cause of a hang may obtain information indicating whether the hung application is waiting for a network-related function to complete.

Thus, some embodiments of the invention provide a method of detecting a hang experienced by an application utilizing a network connection. The hang may be detected in response to receiving an input from a user that is trying to terminate the hung application. In some embodiments, the hang may be detected before the user tries to terminate the hang application. It may then be identified whether the hang is a network hang that is a result of a network condition.

Figure 2:
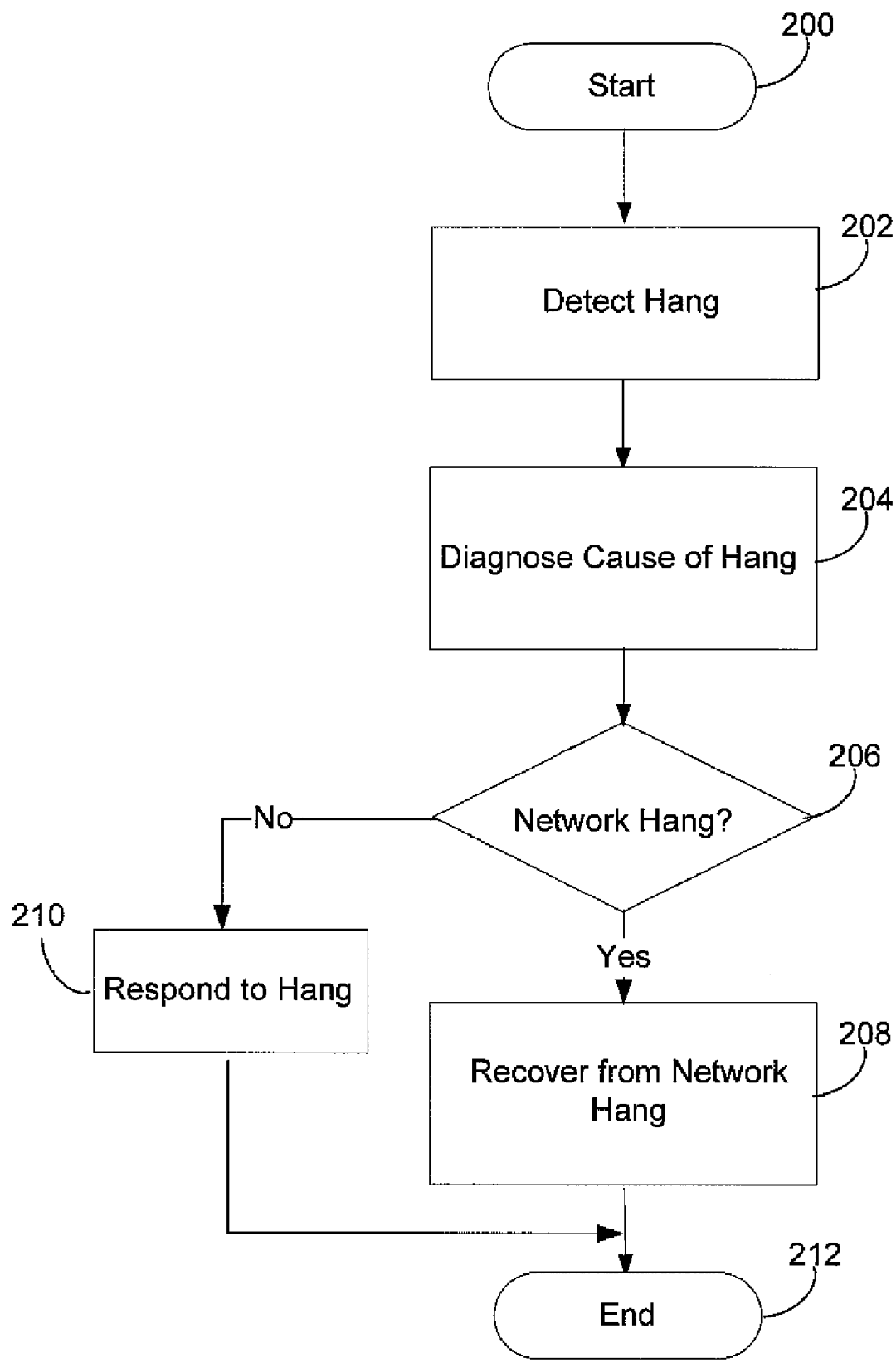
FIG. 2 is a flowchart of a method of operating a computer system executing an application utilizing a network connection according to some embodiments of the invention.

FIG. 2 illustrates a method of operating a computer system executing an application that accesses a network according to some embodiments of the invention. The process may start, at block 200, at any suitable time, such as when a user interacts with the application that has become unresponsive to user input. Though, in some embodiments, the hang may be detected independently of user actions.

At block 204, a cause of the hang may be diagnosed. Processing at block 204 may successively apply known techniques to determine a cause of the hang. In addition, such processing may include a check to determine whether the non-responsive application is waiting for a network function, in which case a network hang may be identified.

The process of FIG. 2 may branch at decision block 206, depending on whether the hang is a network hang. If it is determined that the hang is a network hang, the computer system (e.g., a recovery routine implemented in some embodiments of the invention) may recover from the network hang, at block 208. Recovery may be initiated in response to a user input. For example, once a network hang is detected, a user may be prompted with an option to initiate a recovery attempt. However, a recovery attempt may be initiated in response to any suitable trigger event.

As discussed in more detail below, prior to attempting to recover from a network hang, it may also be determined whether the network hang is recoverable. The network hang may be regarded as recoverable if the network connection used by the application can be canceled in a safe manner that does not negatively impact other applications or users or, in embodiments in which recovery is achieved by canceling a network operation, canceling that operation does not interfere with the network connection, the application or other applications or users. A recoverable network hang may be determined based on a type of the network hang, which may depend on a network protocol used and on whether the network connection is shared. The recoverability of a network hang may be determined prior to offering a user an option to recover from the hang. Though, recoverability may be determined at any suitable time and in any suitable way.

Regardless of how recoverability is determined, if the network hang is recoverable, to recover from the hang, a suitable component of the operating system may recover the application from the network hang to a condition in which it can again respond to user input. The recovery may be caused, for example, by terminating pending network functions. Such functions may be terminated, for example, by canceling one or more operations requested by the hung application. According to some embodiments, a recovery may be initiated by instructing a network stack to terminate the connection. For this purpose, known functionality of the network stack may be employed, which should be understood by one of skill in the art.

Functionality within the application may also be used to recover from a network hang. As is known in the art, applications that communicate over networks typically include error handlers. The error handler may be triggered in response to an indication of a network error event from a network stack. For example, an error may occur when a server goes down. According to some embodiments of the invention, terminating a network correction is included among the events that trigger the error handler. Once invoked, the error handler may respond in any suitable way that may place the application in a state in which it can again respond to user input. In some scenarios, an application may not be recovered from the hang, in which cases a recovery option may not be presented to the user.

Upon recovering the application from the network hang, the process may end at bock 212. However, it should be appreciated that a hang may be detected at any time. Therefore, the process shown in FIG. 2 may continuously monitor (e.g., in block 202) a state of each network connection used by applications on the computer system.

If it is determined in decision block 206 that the hang is not a recoverable network hang, the process may branch to block 210 where the system may respond to the hang using any suitable method. For example, as is known in the art, a user may be given the option to terminate the application, which may cause a loss of data and/or a loss of state. The user may also be given the option to cancel any command to terminate the application. Once such a response is completed, the process may end at bock 212.

Figure 3A:
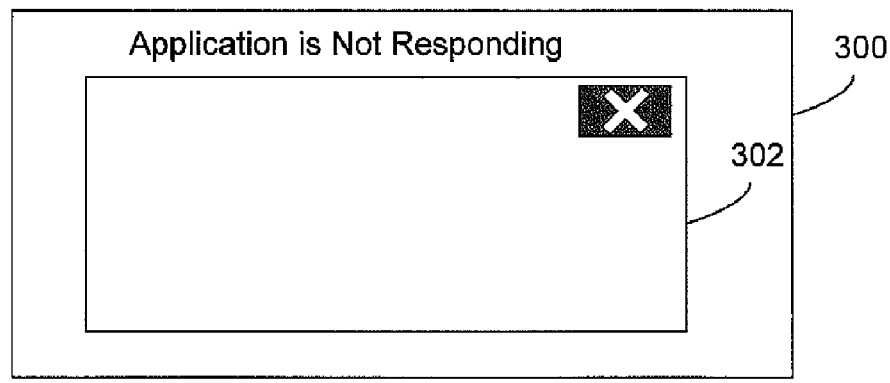
FIGS. 3A-3C are sketches of a user interface according to some embodiments of the invention.
Figure 3B:
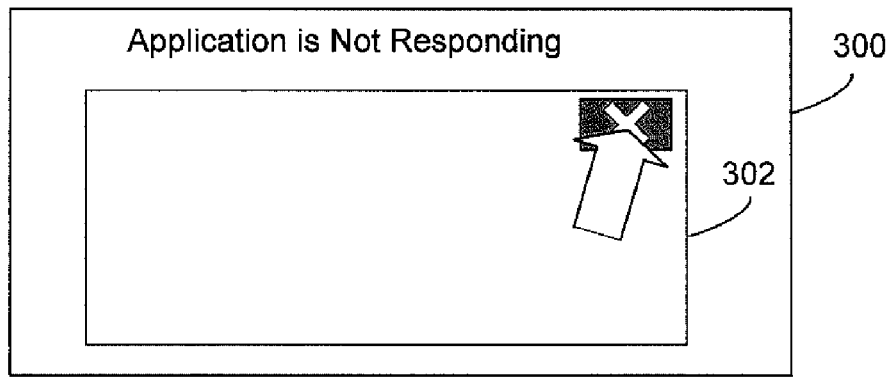
Figure 3C:
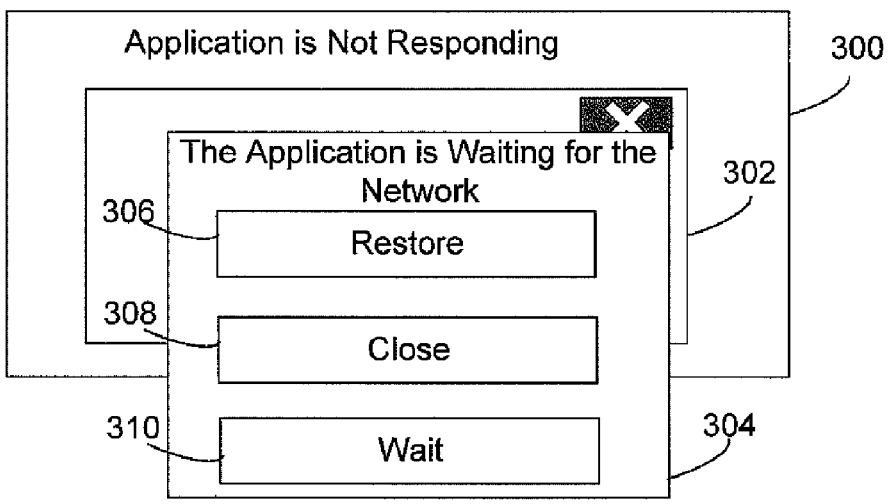

The process of FIG. 2 provides an improved user experience. When a recoverable network hang is detected, the user may be prompted with an option to restore the hung application. The application may be restored by canceling any network operations waiting for a response, which are likely blocking the application. As a result of canceling these operations, the hung application may become responsive again. FIGS. 3A-3C illustrate this user experience according to some embodiments.

FIG. 3A illustrates a user interface 300 including window 302 associated with an application that is not responding to a user input and may therefore be referred to as a hung application. As an example, user interface 300 may present an "Application is not responding" message informing the user that the application is not responsive. However, it should be appreciated that other message of any suitable format may be used to inform the user. For example, the operating system may change the color, opacity or other visual attributes of user interface 300 associated with an application that is not responsive. Though, it should be appreciated that in some embodiments of the invention, no express indication of a hung application may be provided. It should also be appreciated that window 302 may include any suitable textual, visual and other components which are not shown in FIG. 3A for the sake of simplicity.

Similarly, while window 302 is shown to include an "X" button in the upper right hand corner of window 302 acting as a control through which a user may provide input to close the application, it should be appreciated that the window 302 may include any other buttons or other mechanisms through which a user may provide input.

The user may be willing to wait for application 302 to complete an operation only for a limited amount of time. As a result, the user may attempt to terminate the application by closing window 302. FIG. 3B shows as an arrow that the user may click the "X" button to close window 302. Terminating the application may lead to a loss of unsaved data and state of the application. Moreover, the experience of the user may be compromised because the user may become frustrated and dissatisfied with the application and/or the operating system.

As discussed above, to prevent negative consequences that may follow when the user experiences a hung application, some embodiments of the invention implement a method of providing the user with several options with respect to a network hang. For example, as shown in FIG. 3C, the user may be presented with options to restore 306 or close 308 the hung application from the network hang, or wait 310. The options may be presented, for example, on a pop-up window 304, as illustrated in FIG. 3C. A message such as, for example, "The application is waiting for the network" shown in FIG. 3C may be presented to the user to inform the user of the respective state of the application. Though any suitable message may be presented in any suitable format.

It should be appreciated that the options may be presented to the user in any suitable format as the invention is not limited in this respect. The pop-up window 304 also may include other textual and visual elements and may be presented to the user in any suitable format.

Upon being presented with the options to restore or close the hung application, or to wait, the user may select any of the options. Thus, if the user decides to restore the application, suitable component(s) of the operating system discussed in more detail below may initiate a process of recovering the application from the network hang to a state in which it can respond to user input.

If the user selects wait 310, the operating system may wait, at least for some interval, to take any action with respect to the hung application. The operating system may also wait for some event. For example, the operating system may wait until the user attempts to close the application a second time. If the application is still hung after the wait interval, the operating system may again prompt the user with choices such as are illustrated in window 304 or take other suitable action with respect to the hung application.

In response to the user selecting the close 308 option, the operating system may terminate the application. The application may be terminated using known techniques or in any other suitable way. In contrast to restoring the applications, terminating the application may result in a loss of unsaved data and state information.

FIG. 3C illustrates a simple user interface that may be used to offer options to a user. In some embodiments, different or additional information may be presented. Different or additional options may be offered as well. For example, in some embodiments, the user may be informed of a state of the network connection which may be useful to a user in deciding which option to select. The state information may include information on, for example, a slow connection, lost data packets, a progress of the connection as well as other information. Thus, a message such as "Connection is slow but making progress" may be presented to user. In some scenarios, the user may accept the fact that the network connection is slow. Though, the user may be notified if the network connection is not making any progress towards completing a network operation, so that the user may not elect to wait to see if the operation will complete. Any suitable visual, textual and other mechanism may be used to notify the user of the progress of the network connection. For example, a progress bar may be presented on the user interface showing a progress with respect to completing a network operation.

The options presented to the user for responding to the network hang may be selected based on a state of the connection. In some embodiments, a user, network administrator or other party may define a policy that controls the options for responding to a network hang based on the state. In some embodiments, the policy may specify actions taken automatically in certain scenarios.

Figure 4:
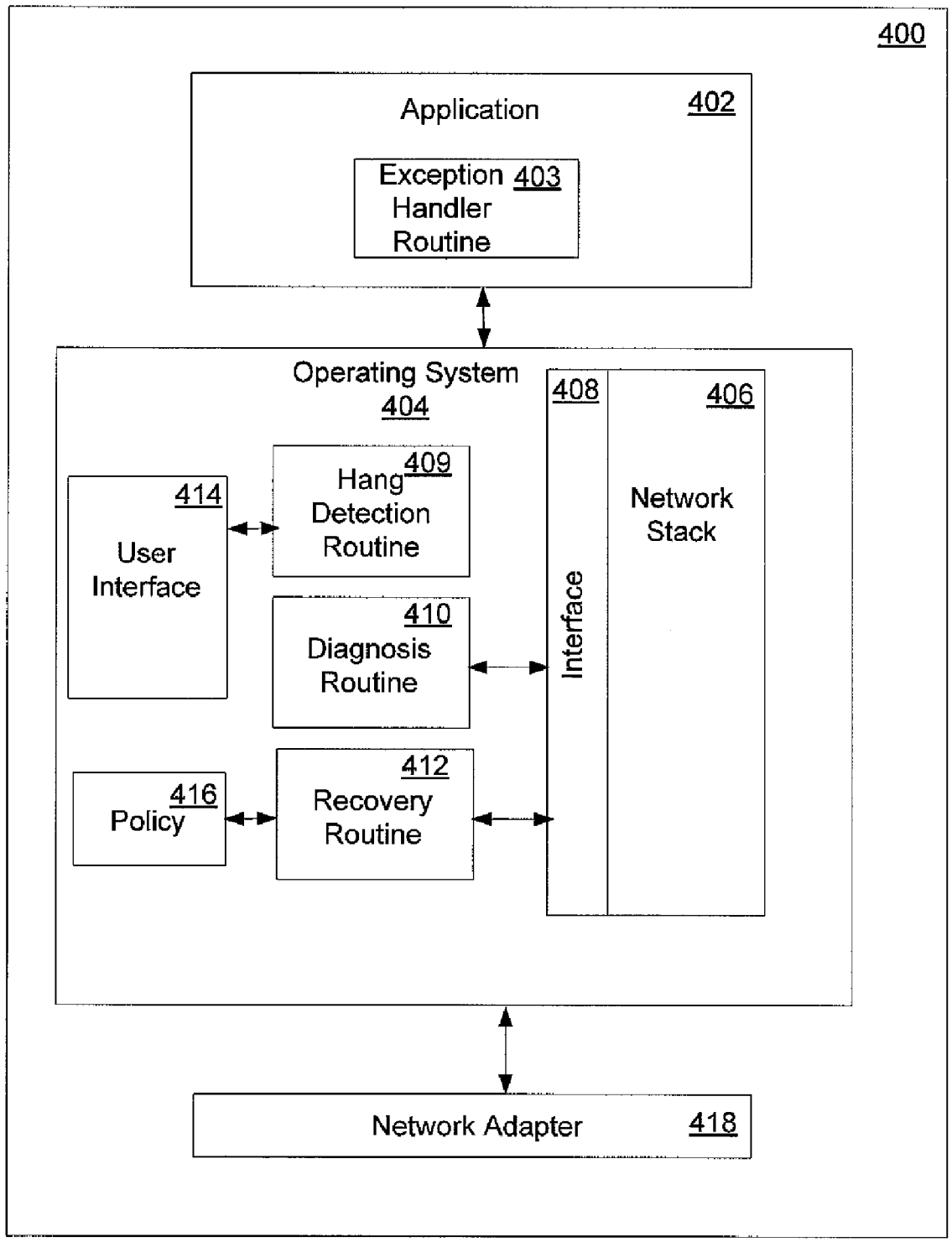
FIG. 4 is a block diagram of a computer system according to some embodiments of the invention.

As discussed above, some embodiments of the invention provide a method of detecting a network hang, diagnosing a type of the hang and selectively recovering from the hang in appropriate circumstances and/or in response to user input. FIG. 4 shows a computer 400 in which some embodiments of the invention may be implemented. Computer 400 may be, for example, a client computer connected to a server over a network (e.g., network 108). Also, computer 400 may employ a peer-to-peer architecture to exchange data with other computers. Computer 400 may include a network adapter 418 or any other component used to communicate with other computers over the network. The network adapter may be a wired adapter, a wireless adapter or any other suitable type of adapter, as this invention is not limited in this respect.

Computer 400 may include an application 402 comprising one or more software modules for performing at least one task. Application 402 may be, for example, a word processor, a web browser, email access application or any other application program executing on computer 400. Traditionally, a client computer includes multiple applications, though only one application is shown for simplicity. Application 402 may access a server (not shown) or other remote device via a network connection over the network. It should be appreciated that application 402 may utilize the network connection in any suitable manner. Application 402 may be coupled to an operating system 404 executed by computer 400. The operating system may be, for example, the Microsoft® Windows® operating system or any other suitable operating system. For the sake of simplicity, some components conventionally included within a computer, which one of skill in the art should understand are present, or that are not involved in providing functionality as described herein may not be shown. Also, boundaries between hardware and software are not expressly shown. Though, in the embodiment illustrated, network adapter 418 may contain hardware elements that implement a special purpose processor and may include driver or other software. The other components may be implemented in software executing on one or more general purpose processors. Though, other architectures are possible.

Operating system 404 may include or be otherwise associated with a user interface 414. User interface 414 may be, for example, a component that allows the operating system to present information to a user or to receive user input through a graphical user interface. User interface 414, for example, may present the user interface elements illustrated in FIGS. 3A-3C. It should be appreciated that user interface 414 may be any suitable interface as embodiments of the invention are not limited in this respect.

Operating system 404 may include a network stack 406. Network stack 406 may be a network stack as is known in the art. Though, any suitable network stack, whether now known or hereafter developed, may be used. In some embodiments, for example, wherein computer 400 deploys the Microsoft® Windows® Vista® operating system, network stack 406 may be a set of layers that handle the Transmission Control Protocol/Internet Protocol (TCP/IP) stack. Network stack 406 may monitor a state of network connections. The network stack may include an application programming interface through which application 402 and other applications may communicate messages and other information for transmission over the network and other purposes. The application interface between network stack and application 402 also allows network stack 406 to signal to application 402 that events have occurred. The events signaled may relate to normal receipt of data directed to application 402 or may include an indication of an error condition. Further, the network stack 406 may have interface 408 to exchange information with operating system 404 or to receive commands from operating system 404, such as a command to break down a network connection.

As discussed above, application 402 may experience delays in receiving a response from a network which may be referred to as a network hang of the application. In the hung state, the application may not be responsive to a user input. In the example illustrated, operating system 404 may recognize that application 402 is not responding to the user input. FIG. 4 shows that operating system 404 may include a hang detection routine 409 which detects a hang. The hang may be detected upon a user input indicative of an attempt to close the hung application or at any other suitable time.

Hang detection routine 409 may operate according to techniques known in the art. Such techniques may include tracking the time it takes for an application to respond to user input or other techniques that indicate the state of application 402. However, the specific techniques used to detect a hung application are not critical to the invention, and any suitable techniques may be used.

Operating system 404 may also include a diagnosis routine 410 used to determine a cause of a hang experienced by application 402. Diagnosis routine 410 may be implemented using techniques similar to those used to implement known hang diagnosis routines. As an example, diagnosis routine 410 may acquire state information from various components of computer system 400 to identify a pending operation associated with the hung application. The pending operations may indicate the cause of the hang. In addition to processing performed in a conventional diagnosis routine, diagnosis routine 410 may poll network stack 406 through interface 408 to obtain state information about the connections in use by application 402. This information may indicate whether a network operation has been pending for a time long enough to constitute a network hang.

In addition, diagnosis routine 410 may obtain state information from network stack 406 through interface 408 that allows diagnosis routine 410 to determine whether the network hang, if one exists, is recoverable. In addition, diagnosis routine 410 may obtain information from other suitable components of the operating system to determine whether the hang is recoverable. For example, diagnosis routine 410 may obtain information relating to the protocol associated with the hung connection and whether the connection is shared with more than one application. As described above, these are examples of parameters that may be used to determine whether breaking down a network connection is likely to impact applications other than the hung application and may therefore be used in determining whether the network hang is classified as recoverable.

In addition, diagnosis routine 410 may obtain state information from network stack 406 that indicates progress of a network connection. For example, the state information may indicate by changing values in counters storing state within network stack 406 that communication is occurring. Such state information may be used, for example, to identify a slow network connection, and may be used to provide additional information to a user about a network hang or to provide information useful in automatically applying a policy for responding to a network hang.

Operating system 404 may include recovery routine 412 which determines whether a recovery should be attempted and when recovery should be attempted, initiates recovery of the application from the network hang. Recovery routine 412 may obtain information from multiple sources concerning a network hang and the hung application to determine whether a recovery should be initiated. Recovery routine 412 may also control operation of other components within computer system 400 to gather information or to control the recovery. For example, recovery routine 412 may obtain information from diagnosis routine 410 indicating that a network hang has been detected. The information would be provided from diagnosis routine 410 to recovery routine 412 in any suitable fashion. Regardless of how this information is obtained, recovery routine 412 may present an appropriate user interface in response to user input indicating a desire to terminate an application with a network hang. If the network hang is recoverable, recovery routine 412 may present, such as through user interface component 414, a user interface offering the user an option to recover the application. Such an option may be offered in conjunction with other options, including an option to close the hung application, an option to cancel the termination command, and an option to restart the hung application. In instances where the network hang is not recoverable, recovery routine 412 may present a user interface offering the option to terminate the application or cancel the termination command without providing the user the option to initiate recovery.

Recovery routine 412 may select the options offered to the user based on information and policy component 416 or obtain from other suitable sources. Recovery routine 412 may also receive user input through user interface 414 or from any other suitable component indicating the user's selection of an option for responding to an application with a network hang. In instances in which the user selects to terminate the application, recovery routine 412 may provide such user input to other components within operating system 404 that perform those functions, as is known in the art. In scenarios in which a user indicates that the application should be recovered, recovery routine 412 may initiate the recovery process.

In the embodiment illustrated, recovery routine 412 may initiate recovery by instructing network stack 406 to terminate the connection. This may result in a recovery from the hang by triggering an exception handler routine 403 in the application 402. Exception handler routine 403 may be any suitable software, including software that uses known techniques for responding to network errors. Such processing may include terminating pending network operations which may be blocking application 402. Thus, application 402 may be released from the hang.

It should be appreciated that routines 409, 410 and 412 shown in FIG. 4 may each include any suitable software modules, but embodiments of the invention are not limited in this respect.

A recovery from the hang may be different depending on a policy established. Also, the recovery may be selected based on a state of the network connection. Thus, operating system 404 may include policy component 416 which may include user preferences with respect to a recovery from hangs and other parameters. Information may be stored in policy 416 automatically or may be manually entered by the user. For example, the user will accept a slow network connection. In such a scenario, recovery routine 412 may come up based on state information obtained from network stack 406, determine that a recovery should not be attempted in response to a network hang on a connection that is slow. Alternatively, the policy may indicate a period of time that recovery routine 412 will wait for a slow connection before presenting the user with options for responding to a network hang, and that period of time may be longer for slow connections than for connections that are not making progress. In addition, policies in the policy component 416 may be established by recovery routine 412. For example, recovery routine 412 may keep track of a time when a recovery of a particular application from a network hang was last attempted, and may determine whether or not to offer the recovery option to the user, depending on how long ago the recovery was last attempted. Though, any suitable policies may be established and policy component 416 may contain information concerning these policies.

Figure 5:
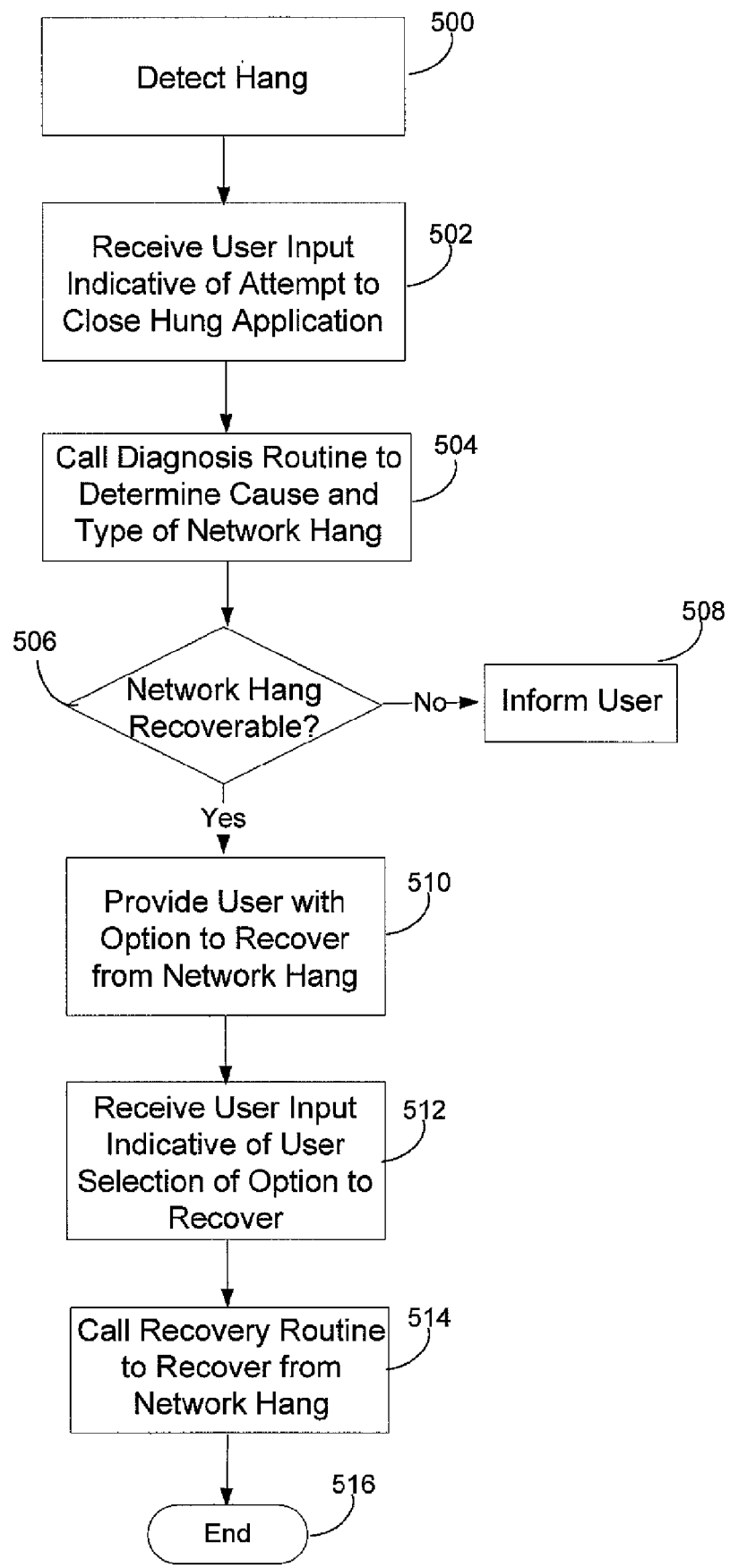
FIG. 5 is a flowchart of a method of detecting and recovering from a network hang according to some embodiments of the invention.

FIG. 5 illustrates a method of detecting and recovering from a network hang according to some embodiments of the invention. One or more of suitable components of the operating system (e.g., hang detection routine 409) may detect the hang. In block 502, the operating system may receive (e.g., via a user interface) a user input indicative of an attempt to close the hung application. It should be appreciated that detecting the hang and receiving the user input indicative of the attempt to close the hung application may occur simultaneously or in any relation with respect to each other.

In block 504, a diagnosis routine (e.g., diagnosis routine 410) may be called to determine the cause of the hang. A suitable component in the operating system that monitors network infrastructure activity (e.g., the network stack) may determine that the application is waiting for a response from the network. For example, the diagnosis routine may determine that the application is currently performing network input/output (I/O). This information, combined with the fact that a hang was detected, may suggest that a network hang has occurred. In some embodiments, it may be determined that the application has been waiting for the response for a period of time that exceeds a threshold and is therefore experiencing a network hang.

In embodiments deploying the Microsoft® Windows® operating system, a Wait Chain Traversal API may be used to determine whether the hang is a network hang. The network hang may occur when the application is blocked on a network I/O. To determine that an application is hung on the network I/O, the last system call made by a thread waiting in a blocking call may be examined. The thread may be associated with the hung application. An object the thread is waiting on may be identified. In some embodiments, the object identified may be used to indicate that the thread is blocked on a network I/O. In this case, a network hang may be diagnosed.

Further information on the network hang may be determined in block 504. Thus, a type of the network hang may be determined, allowing a determination of whether the hang is recoverable. In the embodiment illustrated, a network hang is regarded as recoverable if the network connection causing the hang could be terminated without otherwise effecting other applications. In some embodiments, a network hang may be regarded as recoverable if the network connection causing the hang could be terminated without otherwise effecting not only other applications, but also the hung application itself. Thus, processing at block 504 to determine the type of network hang may involve obtaining information concerning the nature of the network connection. In some embodiments, such information may be obtained based on the protocol used. For example, connections implementing a file system protocol (e.g., a server message block protocol) may be shared among multiple applications. Accordingly, breaking down a connection that gives rise to a network hang may impact applications other than the hung application. Thus, in embodiments in which recovery is triggered by breaking down a network connection, the recovery may interfere with the applications that share the connection with the hung application. In that scenario, a network hung on a connection using a protocol that could be shared by multiple applications may be regarded as not recoverable. In some embodiments, a hang may be classified as not recoverable based simply on the protocol used. In other embodiments, more detailed processing may be employed to ascertain whether other applications actually share the connection.

Regardless of the mechanism used to determine whether the network hang is recoverable, processing may proceed to decision block 506. At decision block 506, the process may branch depending on whether the network hang is recoverable. If the network hang is not recoverable, the process may branch from decision block 506 to block 508. At block 508, the user may be informed of the hung application and may be provided with limited choices for response. Such choices may include terminating the hung application or canceling the command to terminate the application, without offering the user the option to restore the hung application. Such choices may be presented to the user as is known in the art, or in any other suitable way.

Conversely, if the network hang is recoverable, the process may proceed from decision block 506 to block 510.

In block 510, the user may be provided with an option to recover the hung application from the network hang. The option may be provided, for example, via the user interface as shown in FIG. 3C. The user may also be provided with other options such as to close the hung application, to restart the hung application or to wait, along with the option to recover from the network hang. The options may be presented to the user along with information about the network hang, if available. For example, the information would be presented in conjunction with network state information indicating that the connection is slow or other available information about the cause of the network hang.

It should be appreciated that embodiments of the invention are not limited with respect to what information on the hang may be obtained and any suitable user interface may be presented.

In block 512, the operating system (e.g., hang recovery routine 412) may receive user input indicating a selection by the user of the option to recover from the network hang.

At block 514, a recovery routine (e.g., recovery routine 412) may be used to recover from the network hang. In some embodiments, the recovery routine may instruct the network stack to terminate the connection. For this purpose, existing functionality of the network stack may be employed. In response to the broken down connection, an error handling mechanism (e.g., an exception handler routine) associated with the application may be triggered for the application to regain responsiveness.

The exception handler may perform any suitable operations to recover the application from the network hang. In some embodiments, the exception handler may cancel pending operations waiting for a response from the network and return the application to an operating state prior to the time that the hung operations were initiated. Though, exception handlers may be developed to respond to network errors using any suitable error handling response, and the invention is not limited in this regard.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

As one example of a possible variation, embodiments are described in which an application communicating over a single network connection hangs. In embodiments in which an application communicating over two or more network connections hangs, the system may respond by breaking down all of the network connections used in the application. In this way, the connection causing the hang may be eliminated. However, in some embodiments, further processing may be employed to identify the connection of the multiple connections causing the network hang. When the specific connection or connections causing a network hang can be identified, only that connection or set of connections may be broken down.

As an example of another possible variation, it is described above that recovery from a network hang is implemented using existing features within a network stack to break down a network connection. This approach also takes advantage of conventional processing that is already incorporated as an exception handler in an application. Such an approach provides a simple mechanism to facilitate recovery of an application from a network hang. However, other approaches may be used, including approaches that incorporate additional manipulation of elements with the network stack or within the hung application.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device. Also, though FIG. 1 illustrates a system with two computers, system 100 may include more than two computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of operating a computer system executing an application utilizing a network connection, the method comprising:
    detecting that the application is hung due to a network hang;
    in response to a first user input indicative of a user attempt to close the application, determining whether a condition exists under which the hung application is to be restored; and
    selectively initiating recovery of the hung application when it is determined that the condition exists.

2. The method of claim 1, wherein determining whether the condition exists comprises, in response to the first user input indicative of the user attempt to close the application, providing the user with an option to restore the hung application; and
when the user provides a second input indicative of a selection of the option to restore the hung application, initiating an attempt to recover from the network hang.

3. The method of claim 2, wherein the method further comprises, prior to providing the user with the option to restore the hung application:
    determining a type of the network hang; and
    determining that the network hang of the type is recoverable.

4. The method of claim 3, wherein determining that the network hang of the type is recoverable comprises determining that the network connection is not shared between the hung application and another application.

5. The method of claim 1, wherein initiating the attempt to recover from the network hang comprises determining whether the network hang is recoverable.

6. The method of claim 5, further comprising, when it is determined that the network hang is recoverable, recovering from the network hang.

7. The method of claim 6, wherein recovering from the network hang comprises:
    terminating the network connection; and
    triggering an exception handler associated with the application.

8. The method of claim 7, wherein triggering the exception handler associated with the application comprises triggering the exception handler in response to an instruction to a network stack of the computer system to terminate the network connection.

9. The method of claim 5, when it is determined that the network hang is not recoverable, further comprising:
    storing data related to the hung application; and
    terminating the hung application.

10. The method of claim 1, wherein providing the user with the option to restore the hung application further comprises providing the user with one or more options comprising an option to wait for the hung application, an option to close the hung application, and an option to restart the hung application.

11. At least one computer-storage medium encoded with computer-executable instructions that, when executed on a computer used to interact with an application, implement a method of communicating with the application utilizing a network connection, the method comprising:
    detecting that the application is not responsive to at least one user input due to a network hang;
    determining whether a condition exists under which the application is to be restored; and
    selectively initiating recovery of the application when it is determined that the condition exists; wherein:
    detecting that the application is not responsive comprises receiving a first user input indicative of a user attempt to close the hung application;
    determining whether the condition exists comprises providing the user with an option to restore the hung application; and
    selectively initiating recovery of the application comprises, when the user provides a second input indicative of a selection of the option to restore the application, initiating an attempt to recover from the network hang.

12. The at least one computer-storage medium of claim 11, wherein determining whether the condition exists comprises determining a type of the network hang.

13. The at least one computer-storage medium of claim 11, wherein initiating an attempt to recover from the network hang comprises at least one of instructing a network stack of the computer to terminate the network connection and canceling at least one operation of the hung application.

14. The at least one computer-storage medium of claim 13, further comprising triggering an exception handler in response to terminating the network connection.

15. The at least one computer-storage medium of claim 11, wherein determining whether the condition exists comprises:
    providing the user with a plurality of options selected based on information stored in a policy component; and
    receiving user input selecting an option of the plurality of options.

16. In a computer system comprising at least one computer interacting over a network connection, a method comprising:
    detecting that the at least one application is not responsive to at least one user input due to a network hang;
    determining whether the network hang is recoverable;
    when it is determined that the network hang is recoverable:
        offering the user options to recover from the network hang, to terminate the at least one application and to wait; and
    when it is determined that the network hang is not recoverable:
        offering the user options to terminate the at least one application and to wait;
        in response to a user input selecting the option to recover from the network hang, initiating the recovery;
        in response to a user input selecting the option to terminate the at least one application, terminating the at least one application; and
        in response to a user input selecting the option to wait, waiting;
    wherein determining whether the network hang is recoverable comprises determining a type of the network hang.

17. The method of claim 16, wherein determining that the network hang is recoverable comprises determining that the network connection is not shared between the at least one hung application and another application.

18. The method of claim 16, wherein initiating the recovery comprises breaking down the network connection to trigger an exception handler mechanism to recover from the network hang.

* * * * *